US012066790B2

(12) United States Patent
Frank et al.

(10) Patent No.: US 12,066,790 B2
(45) Date of Patent: Aug. 20, 2024

(54) STYRENE-ACRYLATE TONER COMPOSITION

(71) Applicant: Xerox Corporation, Norwalk, CT (US)

(72) Inventors: Jordan A. Frank, Rochester, NY (US); Daniel W. Asarese, Honeoye Falls, NY (US); Chieh-Min Cheng, Rochester, NY (US); Paul K. Acquaviva, Penfield, NY (US); Richard P. N. Veregin, Mississauga (CA); Michael F. Zona, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 389 days.

(21) Appl. No.: 17/167,430

(22) Filed: Feb. 4, 2021

(65) Prior Publication Data

US 2022/0244656 A1 Aug. 4, 2022

(51) Int. Cl.

| | |
|---|---|
| ***G03G 9/087*** | (2006.01) |
| ***G03G 9/08*** | (2006.01) |
| ***G03G 9/09*** | (2006.01) |
| ***G03G 9/093*** | (2006.01) |

(52) U.S. Cl.

CPC ......... *G03G 9/09364* (2013.01); *G03G 9/081* (2013.01); *G03G 9/08711* (2013.01); *G03G 9/08782* (2013.01); *G03G 9/0904* (2013.01); *G03G 9/0918* (2013.01); *G03G 9/09321* (2013.01)

(58) Field of Classification Search

CPC .................................................. G03G 9/08711

See application file for complete search history.

(56) References Cited

U.S. PATENT DOCUMENTS

| | | | |
|---|---|---|---|
| 3,590,000 A | 6/1971 | Palermiti et al. | |
| 4,298,672 A | 11/1981 | Lu | |
| 4,338,390 A | 7/1982 | Lu | |
| 4,935,326 A | 6/1990 | Creatura et al. | |
| 4,937,166 A | 6/1990 | Creatura et al. | |
| 6,214,507 B1 | 4/2001 | Sokol et al. | |
| 7,455,943 B2 | 11/2008 | Patel et al. | |
| 9,639,015 B2 * | 5/2017 | Morales-Tirado ... | G03G 9/0804 |
| 10,409,185 B2 | 8/2019 | Pawar et al. | |

OTHER PUBLICATIONS

Jordan A. Frank, et al., U.S. Appl. No. 16/800,176, filed Feb. 25, 2020.

* cited by examiner

*Primary Examiner* — Peter L Vajda

(74) *Attorney, Agent, or Firm* — Marylou J. Lavoie, Esq. LLC

(57) ABSTRACT

Toner particles including a core and a shell thereover; wherein the core comprises at least one styrene-acrylate copolymer selected from styrene-acrylate copolymer 1, styrene-acrylate copolymer 2, and styrene-acrylate copolymer 3, and combinations thereof a wax; and an optional colorant; wherein the shell comprises at least one styrene-acrylate copolymer selected from styrene-acrylate copolymer 1, styrene acrylate copolymer 2, styrene acrylate copolymer 3, and combinations thereof.

16 Claims, No Drawings

STYRENE-ACRYLATE TONER COMPOSITION

BACKGROUND

Disclosed herein is a toner comprising: toner particles comprising a core and a shell thereover; wherein the core comprises at least one styrene-acrylate copolymer selected from a first core styrene-acrylate copolymer, a second core styrene-acrylate copolymer, and a third core styrene-acrylate copolymer, or a combination thereof; a wax; and an optional colorant; wherein the first core styrene-acrylate copolymer has a weight average molecular weight of from about 32,000 g/mol to about 38,000 g/mol and an onset glass transition temperature of from about 57.0° C. to about 61.0° C.; wherein the second core styrene-acrylate copolymer has a weight average molecular weight of from about 52,000 g/mol to about 58,000 g/mol and an onset glass transition temperature of from about 53.0° C. to about 57.0° C.; and wherein the third core styrene-acrylate copolymer has a weight average molecular weight of from about 33,000 g/mol to about 39,000 g/mol and an onset glass transition temperature of from about 49.0° C. to about 53.0° C.; wherein the shell comprises at least one styrene-acrylate copolymer selected from a first shell styrene-acrylate copolymer, a second shell styrene acrylate copolymer, a third shell styrene acrylate copolymer, or a combination thereof; wherein the first shell styrene-acrylate copolymer has a weight average molecular weight of from about 32,000 g/mol to about 38,000 g/mol and an onset glass transition temperature of from about 57.0° C. to about 61.0° C.; and wherein the second shell styrene-acrylate copolymer has a weight average molecular weight of from about 52,000 g/mol to about 58,000 g/mol and an onset glass transition temperature of from about 53.0° C. to about 57.0° C.; and wherein the third shell styrene-acrylate copolymer has a weight average molecular weight of from about 33,000 g/mol to about 39,000 g/mol and an onset glass transition temperature of from about 49.0° C. to about 53.0° C.

Further disclosed is a method of preparing a toner comprising emulsion aggregation core-shell toner particles comprising toner particles comprising a core and a shell thereover; wherein the core comprises at least one styrene-acrylate copolymer selected from a first styrene-acrylate copolymer, a second styrene-acrylate copolymer, and a third styrene-acrylate copolymer, or a combination thereof; a wax; and an optional colorant; wherein the first styrene-acrylate copolymer has a weight average molecular weight of from about 32,000 g/mol to about 38,000 g/mol and an onset glass transition temperature of from about 57.0° C. to about 61.0° C.; wherein the second styrene-acrylate copolymer has a weight average molecular weight of from about 52,000 g/mol to about 58,000 g/mol and an onset glass transition temperature of from about 53.0° C. to about 57.0° C.; and wherein the third styrene-acrylate copolymer has a weight average molecular weight of from about 33,000 g/mol to about 39,000 g/mol and an onset glass transition temperature of from about 49.0° C. to about 53.0° C.; wherein the shell comprises at least one styrene-acrylate copolymer selected from the first styrene-acrylate copolymer, the second styrene acrylate copolymer, the third styrene-acrylate copolymer, or a combination thereof; the method comprising: obtaining a latex of core styrene-acrylate copolymers, an aqueous dispersion of the optional colorant; an aqueous dispersion of the wax; forming a mixture of the latex of core styrene-acrylate copolymers, the aqueous dispersion of the optional colorant, and the aqueous dispersion of the wax; heating the mixture to a first temperature; maintaining the first temperature to form aggregated toner particles; adding a latex of shell styrene-acrylate copolymers to form a shell over the aggregated particles; optionally, adding a solution of a chelating agent; stopping further aggregation and raising the temperature to a second temperature that is higher than the first temperature to coalesce the aggregated particles; subsequently cooling, optionally washing, and recovering the emulsion aggregation toner particles.

Styrene-acrylate toner compositions are desirable for toners and toner/developers. The toners desirably meet several requirements of the intended machine including hot offset, gloss, aging, and storage stability characteristics.

U.S. Pat. No. 7,455,943, which is hereby incorporated by reference herein in its entirety, describes a toner which includes emulsion aggregation toner particles of a binder including a non-crosslinked styrene acrylate polymer, at least one colorant, at least one wax, and aluminized silica, wherein an amount of aluminum metal in the toner particle is from about 50 ppm to about 600 ppm. Such toner is able to provide a high level of gloss while maintaining a low minimum fixing temperature. The aluminized silica acts as a coagulant during the emulsion aggregation formation process of the toner.

U.S. Pat. No. 10,409,185, which is hereby incorporated by reference herein in its entirety, describes methods of forming a toner. In embodiments, such a method comprises forming a toner from a mixture of at least one resin, at least one wax, and optionally, at least one colorant, wherein the at least one wax is of a type and is present at an amount which are selected to provide a predetermined $PER_{10}$ value for the toner; and measuring a $PER_{10}$ value for the toner, wherein the measured $PER_{10}$ value for the toner is equal to or less than the predetermine $PER_{10}$ value. Toners formed using the methods are also provided.

U.S. patent application Ser. No. 16/800,176, filed Feb. 25, 2020, entitled "Dual Wax Toner Composition," which is hereby incorporated by reference herein in its entirety, describes a toner composition comprising a first wax; a second wax that is different from the first wax; wherein the first wax comprises a paraffin wax; wherein the second wax comprises a polymethylene wax; at least one polyester; and an optional colorant.

Currently available toner compositions are suitable for their intended purposes. However a need remains for improved toner compositions. Further, a need remains for an improved styrene-acrylate toner composition. Still further, a need remains for an improved styrene-acrylate toner composition suitable for single component development machines, in embodiments, for single component development machines that use black toner. Still further, a need remains for an improved styrene-acrylate toner composition that meets requirements of the intended machine including hot offset, gloss, aging, and storage stability characteristics.

The appropriate components and process aspects of the each of the foregoing U.S. patents and Patent Publications may be selected for the present disclosure in embodiments thereof. Further, throughout this application, various publications, patents, and published patent applications are referred to by an identifying citation. The disclosures of the publications, patents, and published patent applications referenced in this application are hereby incorporated by reference into the present disclosure to more fully describe the state of the art to which this invention pertains.

SUMMARY

Described is a toner comprising: toner particles comprising a core and a shell thereover; wherein the core comprises at least one styrene-acrylate copolymer selected from a first core styrene-acrylate copolymer, a second core styrene-acrylate copolymer, and a third core styrene-acrylate copolymer, or a combination thereof; a wax; and an optional colorant; wherein the first core styrene-acrylate copolymer has a weight average molecular weight of from about 32,000 g/mol to about 38,000 g/mol and an onset glass transition temperature of from about 57.0° C. to about 61.0° C.; wherein the second core styrene-acrylate copolymer has a weight average molecular weight of from about 52,000 g/mol to about 58,000 g/mol and an onset glass transition temperature of from about 53.0° C. to about 57.0° C.; and wherein the third core styrene-acrylate copolymer has a weight average molecular weight of from about 33,000 g/mol to about 39,000 g/mol and an onset glass transition temperature of from about 49.0° C. to about 53.0° C.; wherein the shell comprises at least one styrene-acrylate copolymer selected from a first shell styrene-acrylate copolymer, a second shell styrene acrylate copolymer, a third shell styrene acrylate copolymer, or a combination thereof; wherein the first shell styrene-acrylate copolymer has a weight average molecular weight of from about 32,000 g/mol to about 38,000 g/mol and an onset glass transition temperature of from about 57.0° C. to about 61.0° C.; and wherein the second shell styrene-acrylate copolymer has a weight average molecular weight of from about 52,000 g/mol to about 58,000 g/mol and an onset glass transition temperature of from about 53.0° C. to about 57.0° C.; and wherein the third shell styrene-acrylate copolymer has a weight average molecular weight of from about 33,000 g/mol to about 39,000 g/mol and an onset glass transition temperature of from about 49.0° C. to about 53.0° C.

Also described is a method of preparing a toner comprising emulsion aggregation core-shell toner particles comprising toner particles comprising a core and a shell thereover; wherein the core comprises at least one styrene-acrylate copolymer selected from a first styrene-acrylate copolymer, a second styrene-acrylate copolymer, and a third styrene-acrylate copolymer, or a combination thereof; a wax; and an optional colorant; wherein the first styrene-acrylate copolymer has a weight average molecular weight of from about 32,000 g/mol to about 38,000 g/mol and an onset glass transition temperature of from about 57.0° C. to about 61.0° C.; wherein the second styrene-acrylate copolymer has a weight average molecular weight of from about 52,000 g/mol to about 58,000 g/mol and an onset glass transition temperature of from about 53.0° C. to about 57.0° C.; and wherein the third styrene-acrylate copolymer has a weight average molecular weight of from about 33,000 g/mol to about 39,000 g/mol and an onset glass transition temperature of from about 49.0° C. to about 53.0° C.; wherein the shell comprises at least one styrene-acrylate copolymer selected from the first styrene-acrylate copolymer, the second styrene acrylate copolymer, the third styrene-acrylate copolymer, or a combination thereof; the method comprising: obtaining a latex of core styrene-acrylate copolymers, an aqueous dispersion of the optional colorant; an aqueous dispersion of the wax; forming a mixture of the latex of core styrene-acrylate copolymers, the aqueous dispersion of the optional colorant, and the aqueous dispersion of the wax; heating the mixture to a first temperature; maintaining the first temperature to form aggregated toner particles; adding a latex of shell styrene-acrylate copolymers to form a shell over the aggregated particles; optionally, adding a solution of a chelating agent; stopping further aggregation and raising the temperature to a second temperature that is higher than the first temperature to coalesce the aggregated particles; subsequently cooling, optionally washing, and recovering the emulsion aggregation toner particles.

DETAILED DESCRIPTION

Toner particles are described which are comprised of a core resin comprising styrene-acrylate copolymers, a shell resin comprising styrene-acrylate copolymers, an optional pigment, a wax release agent, and, in embodiments, are prepared with a flocculant and a chelating agent.

In embodiments, a toner is described, the toner comprising: toner particles comprising a core and a shell thereover; wherein the core comprises at least one styrene-acrylate copolymer, in embodiments, a combination of at least two styrene-acrylate copolymers, selected from a first styrene-acrylate copolymer (styrene-acrylate copolymer 1), a second styrene-acrylate copolymer (styrene-acrylate copolymer 2), and a third styrene-acrylate copolymer (styrene-acrylate copolymer 3); a wax; and an optional colorant; wherein the first core styrene-acrylate copolymer has a weight average molecular weight of from about 32,000 g/mol to about 38,000 g/mol and an onset glass transition temperature of from about 57.0° C. to about 61.0° C.; wherein the second core styrene-acrylate copolymer has a weight average molecular weight of from about 52,000 g/mol to about 58,000 g/mol and an onset glass transition temperature of from about 53.0° C. to about 57.0° C.; and wherein the third core styrene-acrylate copolymer has a weight average molecular weight of from about 33,000 g/mol to about 39,000 g/mol and an onset glass transition temperature of from about 49.0° C. to about 53.0° C.; wherein the shell comprises at least one styrene-acrylate copolymer selected from a first shell styrene-acrylate copolymer, a second shell styrene acrylate copolymer, a third styrene-acrylate copolymer, or a combination thereof; wherein the first shell styrene-acrylate copolymer (styrene-acrylate copolymer 1) has a weight average molecular weight of from about 32,000 g/mol to about 38,000 g/mol and an onset glass transition temperature of from about 57.0° C. to about 61.0° C.; wherein the second shell styrene-acrylate copolymer (styrene-acrylate copolymer 2) has a weight average molecular weight of from about 52,000 g/mol to about 58,000 g/mol and an onset glass transition temperature of from about 53.0° C. to about 57.0° C., and wherein the third shell styrene-acrylate copolymer (styrene-acrylate copolymer 3) has a weight average molecular weight of from about 33,000 g/mol to about 39,000 g/mol and an onset glass transition temperature of from about 49.0° C. to about 53.0° C.

Molecular weight is determined by gel permeation chromatography according to the usual methods. Onset Tg (onset glass transition temperature) is measured using differential scanning calorimetry and is defined as the intersection of the lines tangent to the heat flow curve both before and after the glass transition.

In embodiments, a toner is described, the toner comprising: emulsion aggregation toner particles comprising a core and a shell thereover; wherein the core comprises a combination of at least two styrene-acrylate copolymers selected from a first core styrene-acrylate copolymer, a second styrene-acrylate copolymer, and a third styrene-acrylate copolymer; a wax; and an optional colorant; wherein the first core styrene-acrylate copolymer has a weight average molecular weight of from about 32,000 g/mol to about 38,000 g/mol and an onset glass transition temperature of from about 57.0° C. to about 61.0° C.; wherein the second core styrene-acrylate copolymer has a weight average molecular weight of from about 52,000 g/mol to about 58,000 g/mol and an onset glass transition temperature of from about 53.0° C. to about 57.0° C.; and wherein the third core styrene-acrylate copolymer has a weight average molecular weight of from about 33,000 g/mol to about 39,000 g/mol and an onset glass transition temperature of from about 49.0° C. to about 53.0° C.; wherein the shell comprises at least one styrene-acrylate copolymer selected from a first shell styrene-acrylate copolymer, a second shell styrene acrylate copolymer, a third or a combination thereof; wherein the first shell styrene-acrylate copolymer has a weight average molecular weight of from about 32,000 g/mol to about 38,000 g/mol and an onset glass transition temperature of from about 57.0° C. to about 61.0° C.; and wherein the second shell styrene-acrylate copolymer has a weight average molecular weight of from about 52,000 g/mol to about 58,000 g/mol and an onset glass transition temperature of from about 53.0° C. to about 57.0° C.; wherein the toner comprises from about 50 to about 80 percent by weight core, wherein the toner comprises from about 50 to about 60 percent by weight core, or from about 52 to about 56 percent by weight core; from about 20 to about 36 percent by weight shell, or from about 24 to about 32 percent by weight shell, or from about 26 to about 30 percent shell; from about 3 to about 10 percent by weight colorant, or from about 4 to about 8 percent, or from about 5 to about 7 percent colorant; and from about 5 to about 20 percent by weight wax, or from about 7 to about 20 percent by weight wax, or from about 9 to about 16 percent wax; where percent is percent by weight based on total weight of the toner.

In a specific embodiment, the toner core comprises a combination of the first styrene-acrylate copolymer having a weight average molecular weight of from about 32,000 g/mol to about 38,000 g/mol and an onset glass transition temperature of from about 57.0° C. to about 61.0° C. and the second core styrene-acrylate copolymer has a weight average molecular weight of from about 52,000 g/mol to about 58,000 g/mol and an onset glass transition temperature of from about 53.0° C. to about 57.0° C.; and the toner shell comprises a single shell resin, and wherein the shell resin is the first core styrene-acrylate copolymer having a weight average molecular weight of from about 32,000 g/mol to about 38,000 g/mol and an onset glass transition temperature of from about 57.0° C. to about 61.0° C.

In a specific embodiment, a toner is described, the toner comprising a pigment, in embodiments, carbon black, in embodiments wherein the pigment is present in an amount of from about 3 to about 10 percent by weight, or from about 4 to about 8 percent by weight, or from about 5 to about 7 percent by weight, based upon the total weight of the toner particle; a wax, in embodiments a polyethylene wax, a paraffin wax, or a combination thereof, in embodiments wherein the wax is present in an amount of from 7 to about 20 percent by weight, or from about 9 to about 16 percent by weight, based upon the total weight of the toner particle; a core resin comprising at least one styrene-acrylate copolymer, in embodiments, comprising a combination of at least two styrene-acrylate copolymers selected from the group consisting of styrene-acrylate copolymer 1, styrene-acrylate copolymer 2, and styrene-acrylate copolymer 3, wherein the core resin is present in an amount of from about 50 to about 60 percent by weight, or from about 52 to about 56 percent by weight based on the total weight of the toner particle; a shell resin comprising at least one styrene-acrylate copolymer selecting from the group consisting of styrene-acrylate copolymer 1, styrene-acrylate copolymer 2, styrene-acrylate copolymer 3, and combinations thereof, wherein the shell resin is present in an amount of from about 26 to about 30 percent, or from about 26 to about 28 percent by weight based upon the total weight of the toner particle; a flocculant, in embodiments, polyaluminum chloride, wherein the flocculant is present in an amount of about 0.18 pph (parts per hundred, based on the total weight of the toner); and a chelating agent, in embodiments, ethylene diamine tetraacetic acid (EDTA), wherein the chelating agent is present in an amount of about 0.79 pph (parts per hundred, based on the total weight of the toner). Here, the intention is to describe the pph based on the raw materials which actually remain in the final toner.

Core Resin.

The toner core herein comprises one or a combination of styrene-acrylate copolymers. In embodiments, the core resin comprises a first styrene-acrylate copolymer, a second styrene-acrylate copolymer, and optionally a third styrene-acrylate copolymer. The first, second, and third styrene-acrylate copolymers are different. In embodiments, the shell resin comprises at least one styrene-acrylate copolymer, in embodiments, a combination of two styrene-acrylate copolymers, in further embodiments, a combination of three styrene-acrylate copolymers. Each of the styrene-acrylate copolymers possesses a certain molecular weight and glass transition temperature. The styrene-acrylate copolymers are selected to provide to the toner as a whole a certain molecular weight. Thus, a unique combination of core latexes is described which provide to the toner as a whole desired properties such as toner molecular weight, glass transition temperature, melt viscosity, and triboelectric charging characteristic.

In embodiments, the toner is prepared with a flocculant, a chelating agent, or both a flocculant and a chelating agent.

The amount of flocculant put in when preparing the toner is, in embodiments, from about 0.01 to about 1.00, or from about 0.05 to about 0.50, or from about 0.10 to about 0.20 parts per hundred (pph) based upon the total weight of dried toner particle.

The amount of chelating agent put in when preparing the toner is, in embodiments, from about 0.01 to about 1.50, or from about 0.50 to about 1.00, or from about 0.75 to about 0.85 parts per hundred (pph) based upon the total weight of dried toner particle.

In embodiments, the amount of flocculant put in when preparing the toner is selected to provide a residual amount of flocculant in the final toner of from about 1 to about 1,000, or from about 350 to about 550, or from about 425 to about 475 parts per million (ppm) flocculant based upon the total weight of the toner. For aluminum based flocculant, the active ingredient in the flocculant is elemental aluminum ion. The inactive counterion of the flocculant gets filtered away. For aluminum based flocculant, verifying remaining flocculant in the toner can be done by testing for elemental aluminum. Thus, in embodiments, the toner is selected to provide a residual amount of aluminum in the final toner of from about 1 to about 1,000, or from about 350 to about 550, or from about 425 to about 475 parts per million (ppm) aluminum based upon the total weight of the dried toner particle.

In embodiments, the amount of chelating agent put in when preparing the toner is selected to provide a residual amount of chelating agent in the final toner of from about 0 to about 8,000, or from about 10 to about 100, or from about 20 to about 50 parts per million (ppm) based upon the total weight of the dried toner particle.

By selecting the flocculant, chelating agent, or combination thereof, desired rheological properties of the final toner can be achieved. For example, melt-viscosity, measured by melt flow index (MFI), can be decreased by using greater amount of chelating agent or increased by using a greater amount of flocculant. Also, the Tg can be decreased by using a greater amount of chelating agent.

In embodiments, the toner particles comprise, are prepared with, various combinations of the three styrene-acrylate latexes described herein: styrene-acrylate copolymer 1, styrene-acrylate copolymer 2, and styrene-acrylate copolymer 3.

In embodiments, styrene-acrylate copolymer 1 is a styrene-acrylate copolymer wherein the molar ratio of monomers is from about 80 to about 90 parts styrene, from about 10 to about 20 parts n-butylacrylate, and from about 0.5 to about 3 parts β-carboxyethylacrylate, wherein the weight average molecular weight (Mw) value is from about 32,000 g/mol to about 38,000 g/mol, and wherein the number average molecular weight (Mn) value is from about 13,000 g/mol to about 18,000 g/mol. Both the Mw and the Mn may be determined using Gel Permeation Chromatography (GPC). In embodiments, styrene-acrylate copolymer 1 has a glass transition temperature (Tg) in the range of from about 55° C. to about 65° C., from about 57° C. to about 64° C., or from about 57° C. to about 61° C. The Tg may be determined using Differential Scanning calorimetry (DSC). Onset Tg is defined as the intersection of the lines tangent to the heat flow curve both before and after the glass transition.

In embodiments, styrene-acrylate copolymer 2 is a styrene-acrylate copolymer wherein the molar ratio of monomers is from about 70 to about 80 parts styrene, from about 20 to about 30 parts n-butylacrylate, and from about 0.5 to about 3.0 parts β-carboxyethylacrylate, wherein the weight average molecular weight (Mw) value is from about 52,000 g/mol to about 58,000 g/mol, and wherein the number average molecular weight (Mn) value is from about 28,000 g/mol to about 33,000 g/mol. Both the Mw and the Mn may be determined using Gel Permeation Chromatography (GPC). In embodiments, styrene-acrylate copolymer 2 has a glass transition temperature (Tg) in the range of from about 50.0° C. to about 60.0° C., from about 52.0° C. to about 59.9° C., or from about 53.0° C. to about 57.0° C. The Tg may be determined using Differential Scanning calorimetry (DSC).

In embodiments, styrene-acrylate copolymer 3 is a styrene-acrylate copolymer wherein the molar ratio of monomers is from about 70 to about 80 parts styrene, from about 20 to about 30 parts n-butylacrylate, and from about 0.5 to about 3.0 parts β-carboxyethylacrylate, wherein the weight average molecular weight (Mw) value is from about 33,000 g/mol to about 39,000 g/mol, and wherein the number average molecular weight (Mn) value is from about 13,000 g/mol to about 18,000 g/mol. Both the Mw and the Mn may be determined using Gel Permeation Chromatography (GPC). In embodiments, styrene-acrylate copolymer 3 has a glass transition temperature (Tg) in the range of from about 46.0° C. to about 56.0° C., from about 48.0° C. to about 54.0° C., or from about 49.0° C. to about 53.0° C. The Tg may be determined using Differential Scanning calorimetry (DSC).

In embodiments, the toner particle core resins and shells resins are selected to provide to the final toner a weight average molecular weight (Mw) of from about 38,000 g/mol to about 48,000 g/mol, or from about 40,000 g/mol to about 46,000 g/mol, or from about 42,000 g/mol to about 45,000 g/mol, and a number average molecular weight (Mn) value of from about 16,000 g/mol to about 23,000 g/mol, or from about 17,000 g/mol to about 22,000 g/mol, or from about 18,000 g/mol, to about 21,000 g/mol. Toner Mw and the Mn may be determined using Gel Permeation Chromatography (GPC).

In embodiments, the toner particle core resins and shells resins are selected to provide to the final toner an onset glass transition temperature (Tg) in the range of from about 53.0° C. to about 60.0° C., from about 54.0° C. to about 58.0° C., or from about 55.0° C. to about 57.0° C. The toner Tg may be determined using Differential Scanning calorimetry (DSC). As described earlier, the "Onset Tg" is defined as the intersection of the lines tangent to the heat flow curve both before and after the glass transition. Unless otherwise stated, as used here "Tg" and "onset Tg" bother refer to onset glass transition temperature.

Known chain transfer agents can be utilized to control the molecular weight properties of the core resin polymer and shell resin polymer. Examples of chain transfer agents include dodecanethiol, dodecylmercaptan, octanethiol, carbon tetrabromide, carbon tetrachloride, and the like, present in various suitable amounts, for example from about 0.1 to about 10 percent by weight of the total monomers, such as from about 0.1 to about 8 percent by weight or from about 0.2 to about 5 percent by weight of total monomers.

In embodiments, the toner particles have a core-shell structure. The core comprises a combination of styrene-acrylate copolymers. In embodiments, the core comprises a combination of a first styrene-acrylate copolymer, a second styrene-acrylate copolymer, and optionally a third styrene-acrylate copolymer, wherein the first core styrene-acrylate copolymer is styrene-acrylate copolymer 1; wherein the second core styrene-acrylate copolymer is styrene-acrylate copolymer 2; and wherein the optional third styrene-acrylate copolymer is styrene-acrylate copolymer 3. In other embodiments, the core comprises at least one of styrene-acrylate copolymer 1, styrene-acrylate copolymer 3, or a combination of styrene-acrylate copolymer 1 and styrene-acrylate copolymer 3. In other embodiments, the core comprises at least one of styrene-acrylate copolymer 2, styrene-acrylate copolymer 3, or a combination of styrene-acrylate copolymer 3. In a specific embodiment, the core comprises a combination of the first styrene-acrylate copolymer and the second styrene-acrylate copolymer.

The shell comprises at least one styrene-acrylate copolymer selected from styrene-acrylate 1, styrene-acrylate 2, and styrene-acrylate 3, or a combination thereof. In embodiments, the shell comprises a first styrene-acrylate copolymer and a second styrene-acrylate copolymer, wherein the first shell styrene-acrylate copolymer is styrene-acrylate copolymer 1, and wherein the second shell styrene-acrylate copolymer is styrene-acrylate copolymer 2. In a specific embodiment, the shell comprises only styrene-acrylate copolymer 1.

Thus, in embodiments, the toner particle has a core-shell structure wherein the core comprises a first, second, and optional third styrene-acrylate copolymer; wherein the first core styrene-acrylate copolymer is styrene-acrylate copolymer 1; wherein the second core styrene-acrylate copolymer is styrene-acrylate copolymer 2; and wherein the optional third styrene-acrylate copolymer is styrene-acrylate copolymer 3; and wherein shell comprises a first and a second styrene-acrylate copolymer, wherein the first shell styrene-acrylate copolymer is styrene-acrylate copolymer 1; and wherein the second shell styrene-acrylate copolymer is styrene-acrylate copolymer 2. Further, in this embodiment, the core may include a colorant comprises a combination of carbon black and cyan pigment.

In other embodiments, the toner particle has a core-shell structure where the core comprises one or a combination of styrene-acrylate copolymer 1 and styrene-acrylate copolymer 3 and where the shell comprises one or a combination of styrene-acrylate copolymer 1, styrene-acrylate copolymer 2, and styrene-acrylate copolymer 3. In embodiments, the core comprises styrene-acrylate copolymer 1 and 3 and the shell comprises a single styrene-arylate copolymer 1. In other embodiments, the core comprises styrene-acrylate copolymer 1 and 3 and the shell is styrene-acrylate copolymer 2. In another embodiment, the core comprises styrene-acrylate copolymer 2 and 3, and the shell is styrene-acrylate copolymer 2. In still another embodiment, the core comprises styrene-acrylate copolymer 3 and the shell comprises styrene-acrylate copolymer 1. In still another embodiment, the core comprises styrene-acrylate copolymer 3 and the shell comprises styrene-acrylate copolymer 2. In another embodiment, the core comprises styrene-acrylate copolymer 3 and the shell comprises styrene-acrylate copolymer 3. In a specific embodiment, the toner particle has a core-shell structure where the core comprises a combination of styrene-acrylate copolymer 1 and styrene-acrylate copolymer 2 and where the shell comprises only styrene-acrylate copolymer 1. Further, in embodiments, the core may include a colorant comprising at least one of black, carbon black, cyan, magenta pigment, and yellow pigment, in embodiments, copper phthalocyanine, PR122, PR269, PY74, or a combination thereof.

The toner particle core may comprise the combination of styrene-acrylate copolymers described herein as well as the colorant(s) and wax(es) described herein. One the core particle is formed and aggregated to a desired size, a thin outer shell is then formed upon the core particle. The shell may be comprised of one or a combination of styrene-acrylate copolymers as described herein.

The shell latex may be added to the core toner particle aggregates in any suitable or desired amount, in embodiments, the shell latex may be added to the core toner particle aggregates in an amount of from about 20 to about 45 percent by weight of the total binder materials (that is, the total amount of core plus shell latex), or from about 25 to about 40 percent by weight, or from about 30 to about 235 percent by weight, based on the total weight of the binder materials (core plus shell latex).

In embodiments, the toner comprises from about 50 to about 60 percent by weight core resin, or from about 52 to about 56 percent by weight core resin; from about 26 to about 30 percent by weight shell resin, or from about 26 to about 28 percent shell resin; from about 3 to about 10 percent by weight colorant, or from about 4 to about 8 percent, or from about 5 to about 7 percent colorant; and from about 7 to about 20 percent by weight wax, or from about 9 to about 16 percent wax; where percent is percent by weight based on total weight of the toner.

The total amount of binder, including core and shell resins, may be from about 60 to about 95 percent by weight of the toner particles (that is, toner particles exclusive of external additives) on a solids basis, or from about 70 to about 90 percent by weight of the toner particles.

In embodiments, the polymer for the core and shell binders may each be formed into a latex for use in the subsequent emulsion aggregation toner particle formation process. Such may be done by mixing the monomer components, including any additive agents, in an aqueous phase, optionally in the presence of one or more surfactants, and then polymerizing the monomers, for example with the use of an initiator, to form small sized seed particles. A latex having an aqueous phase with small sized polymer particles therein, for example of from about 5 nanometers (nm) to about 500 nm, or from about 50 nm to about 300 nm, is derived. Any suitable method for forming the latex from the monomers may be used. Latex particle sizes are given as volume-averaged median particle diameter, measured using a Nanotrac particle size analyzer. "Nanotrac" is the model name of the particle size analyzer made by Microtrac. It uses dynamic light scattering technology.

Various suitable colorants can be employed, including suitable colored pigments, dyes, and mixtures thereof. Examples of suitable colorants include carbon black such as REGAL® 330 carbon black, acetylene black, lamp black, aniline black, Chrome Yellow, Zinc Yellow, SICOFAST Yellow, SUNBRITE® Yellow, LUNA Yellow, NOVAPERM® Yellow, PY74 (Monoazo Yellow), Chrome Orange, BAYPLAST® Orange, Cadmium Red, LITHOL® Scarlet, HOSTAPERM Red, PR122 (Quinacridone Red or Pigment Red 122), PR269 (Napthol Red), FANAL® PINK, HOSTAPERM® Pink, LUPRETON Pink, LITHOL Red, RHODAMINE Lake B, Brilliant Carmine, HELIOGEN® Blue, HOSTAPERM® Blue, NEOPAN® Blue, PV Fast® Blue, copper phthalocyanine, CINQUASSI® Green, HOSTAPERM® Green, titanium dioxide, cobalt, nickel, iron powder, SICOPUR 4068 FF, and iron oxides such as MAPICO™ Black (Columbia), NP608 and NP604 (Northern Pigment), BAYFERROX® 8610 (Bayer), and M08699 (Mobay), TMB-100 (Magnox), mixtures thereof, and the like.

In embodiments, the optional colorant is present and is selected from cyan, magenta, yellow, black, or a combination thereof. Carbon black may be used with one or more other colorants, such as a cyan colorant, to produce a desired hue. In embodiments, the optional colorant is present and comprises a combination of cyan pigment and carbon black. In further embodiments, the optional colorant is present and comprises a combination of carbon black, copper phthalocyanine, magenta, and yellow, in embodiments where magenta is pigment red and yellow is pigment yellow.

The colorant may be included in any suitable or desired amount. In embodiments, the colorant, for example, carbon black, cyan, magenta, and/or yellow colorant, is incorporated in an amount sufficient to impart the desired color to the toner. In general, pigment or dye is employed in an amount of from about 2 percent to about 35 percent by weight of the toner particles on a solids basis, such as from about 2 percent to about 25 percent by weight, or from about 2 percent to about 20 percent by weight of the toner particles. In a specific embodiment, the colorant is included in an amount of from about 3 to about 10 percent by weight total colorant, based on the total weight of the toner particle, wherein the total colorant comprises a combination of black and cyan colorant, in embodiments, carbon black and cyan. In embodiments, the colorant comprises a combination of carbon black and cyan, wherein the carbon black is included in an amount of from about 1 to about 25 or form about 4 to about 10 or from about 5 to about 7 percent carbon black and wherein the cyan is included in an amount of from about 0 to about 3 or from about 0.5 to about 2 percent cyan.

To incorporate the colorant into the toner, the colorant may be in the form of an aqueous emulsion or dispersion of colorant in water, optionally with use of a surfactant such as an anionic or non-ionic surfactant, where the colorant is, in embodiments, a pigment having a particle size of from about 50 nanometers (nm) to about 3,000 nm, or from about 100 nm to about 2,000 nm, or from about 50 nm to about 1,000 nm. Pigment particle sizes are given as volume-averaged median particle diameter, measured using a Nanotrac particle size analyzer.

Anionic surfactants include sodium dodecylsulfate (SDS), sodium dodecyl benzene sulfonate, sodium dodecylnaphthalene sulfate, dialkyl benzenealkyl sulfates and sulfonates, abietic acid, and the NEOGEN® brand of anionic surfactants. An example of a suitable anionic surfactant is NEOGEN® RK available from Daiichi Kogyo Seiyaku co. Ltd., or TAYCA POWER BN2060 from Tayca Corporation (Japan), which consists primarily of branched sodium dodecyl benzene sulphonate. An effective concentration of the anionic surfactant generally employed is, for example, from about 0.01 to about 10 percent by weight, or from about 0.1 to about 5 percent by weight, based on the weight of the dispersion.

Examples of cationic surfactants include dialkyl benzene alkyl ammonium chloride, lauryl trimethyl ammonium chloride, alkylbenzyl methyl ammonium chloride, alkyl benzyl dimethyl ammonium bromide, benzalkonium chloride, ethyl pyridinium bromide, C12, C15, C17 trimethyl ammonium bromides, halide salts of quaternized polyoxyethylalkylamines, dodecyl benzyl triethyl ammonium chloride. MIRAPOL® and ALKAQUAT® available from Alkaril Chemical Company, SANISOL® (benzalkonium chloride) available from Kao Chemicals, and the like. An example of a suitable cationic surfactant is SANISOL® B-50 available from Kao Corp., which consists primarily of benzyl dimethyl alkonium chloride. An effective concentration of the cationic surfactant generally employed is, for example, from about 0.01 to about 10 percent by weight, or from about 0.1 to about 5 percent by weight, based on the weight of the dispersion.

Examples of nonionic surfactants include polyvinyl alcohol, polyacrylic acid, methalose, methyl cellulose, ethyl cellulose, propyl cellulose, hydroxyl ethyl cellulose, carboxy methyl cellulose, polyoxyethylene cetyl ether, polyoxyethylene lauryl ether, polyoxytheylene octyl ether, polyoxyethylene octylphenyl ether, polyoxyethylene oleyl ether, polyoxyethylene sorbitan monolaurate, polyoxyethylene stearyl ether, polyoxyethylene nonylphenyl ether, dialkylphenoxy poly(ethyleneoxy) ethanol, available from Rhone-Poulenc Inc. as IGEPAL® CA-210, IGEPAL® CA-520, IGEPAL® CA-720, IGEPAL® CO-890, IGEPAL® CO-720, IGEPAL® CO-290, IGEPAL® CA-210, ANTAROX® 890 and ANTAROX® 897. An example of a suitable nonionic surfactant is ANTAROX® 897 available from Rhone-Poulenc Inc., which consists primarily of alkyl phenol ethoxylate. An effective concentration of the nonionic surfactant generally employed is, for example, from about 0.01 to about 10 percent by weight, or from about 0.1 to about 5 percent by weight, based on the weight of the dispersion.

In addition to the polymer binder (styrene-acrylate resins) and the colorant, the toner may further comprise a wax, in embodiments used in the form of a wax dispersion to form the toner. The wax may be included in the toner formulation to aid toner offset resistance, for example toner release from the fuser roll, particularly in low oil or oil-less fuser designs.

Waxes that may be selected include, for example, polyolefins such as polymethylene, polyethylene, polypropylene, polybutene, as well as waxes made by the Fischer-Tropsch process. In embodiments, the toner includes a wax selected from a member of the group consisting of a Fischer-Tropsch wax, a polyethylene wax, a paraffin wax, and combinations thereof. In embodiments, the wax is a Fischer-Tropsch wax. In other embodiments, the wax is a paraffin wax. In still other embodiments, the wax is a polyethylene wax. In still further embodiments, the wax comprises a combination of a paraffin wax and one or more Fischer-Tropsch waxes.

In embodiments, the wax is a linear Fischer-Tropsch wax derived from carbon monoxide or other low molecular weight feedstocks, such as is produced by Sasol or Shell-Malaysia. The wax may have a peak melting temperature of from about 70° C. to about 100° C., or from about 85° C. to about 95° C., measured using differential scanning calorimetry.

In embodiments, the wax is a linear hydrocarbon having from about 46 to about 56 carbon atoms and a peak melting temperature of from about 88° C. to about 100° C.

In embodiments, the wax is a polyethylene wax having a peak melt temperature of from about 85° C. to about 110° C., or from about 95° C. to about 105° C.

Any suitable or desired paraffin wax can be selected for embodiments herein. In embodiments, the paraffin wax can be selected from the group consisting of BW-422 and BW-436 from Blended Waxes, Inc.; IGI 1245A, IGI 1250A, IGI 1297A, IGI 1266A all from the International Group, Inc.; Indrawax 6062-F, Indrawax 6264-F, Indrawax 6466-F, Indrawax 6668-F, Indrawax 6870-F, Indrawax 7072-F, Indrawax 8070, Indrawax 6062-S 140-144, Indrawax 6062-S all from Industrial Raw Materials LLC, Shell Sarawax SX70 from Alpha Wax, Strahl & Pitsch 434 and 674 paraffin waxes; dispersions of paraffin waxes including CHEMBEAD® 30, CHEMBEAD® 30-AM, PARAFINE 30, PARAFFIN 60, PARAFFIN EMULSION 135-45 FDA, PARAFFIN EMULSION 150-45 FDA, all from BYK Additives & Instruments, and combinations thereof.

To incorporate the wax into the toner, the wax may be in the form of an aqueous emulsion or dispersion of solid wax in water, where the solid wax particle size is usually in the range of from about 100 to about 500 nm. Particle size means volume-averaged median particle diameter, measured using a Nanotrac particle size analyzer which uses dynamic light scattering technology.

In embodiments, the toner includes a total amount of wax of from about 3.5 to about 20 percent, or from about 5 to about 20 percent, or from about 7 to about 20 percent, or from about 9 to about 16 percent by weight based upon the weight of the toner.

The toners herein may also contain a flocculant or coagulant, such as a monovalent metal coagulant, a divalent metal coagulant, a polyion coagulant, or the like. A variety of coagulants are known in the art. As used herein, "polyion coagulant" refers to a coagulant that is a salt or oxide, such as a metal salt or metal oxide, formed from a metal species having a valence of at least 3, and desirably at least 4 or 5. Suitable coagulants thus include, for example, coagulants based on aluminum such as polyaluminum halides such as polyaluminum fluoride and polyaluminum chloride (PAC), polyaluminum silicates such as polyaluminum sulfosilicate (PASS), polyaluminum hydroxide, polyaluminum phosphate, and the like. Other suitable coagulants include, but are not limited to, tetraalkyl titinates, dialkyltin oxide, tetraalkyltin oxide hydroxide, dialkyltin oxide hydroxide, aluminum alkoxides, alkylzinc, dialkyl zinc, zinc oxides, stannous oxide, dibutyltin oxide, dibutyltin oxide hydroxide, tetraalkyl tin, and the like. Where the coagulant is a polyion coagulant, the coagulants may have any desired number of polyion atoms present. For example, suitable polyaluminum compounds, in embodiments, may have from about 2 to about 13, or from about 3 to about 8, aluminum ions present in the compound. In embodiments, a polyaluminum chloride flocculant is selected.

Such coagulants can be incorporated into the toner particles during particle aggregation. As such, the coagulant can be present in the toner particles, exclusive of external additives and on a dry weight basis, in amounts of from about 0 to about 5 percent, or from about greater than 0 to about 3 percent, by weight of the toner particles. In embodiments, the flocculant (or coagulant) is used in an amount of about 0.18 pph based on the total weight of the toner.

For high gloss, the presence of aluminum metal and/or metal ions in the end toner particle is not desirable because the aluminum hinders the gloss that can be obtained (the higher the aluminum content, the lower the gloss of the toner, for example due to the crosslinking), and thus aluminum should be substantially extracted from the formed toner particles. Although such extraction may be done by any suitable method, the method in embodiments, comprises adding a chelating or sequestering agent to the aggregated toner particles to extract aluminum ions therefrom in a controlled manner, i.e., in a manner such that the end content of aluminum present in the toner can be controlled. As the sequestering or chelating agent, in embodiments, ethylenediaminetetraacetic acid (EDTA), commercially available as VERSENE® 100, sodium silicate solution, and the like, may be selected.

A chelating agent or sequestering agent may be added in an amount effective to extract aluminum ions from the solution such that the final aluminum content in the toner is less than about 1,000 ppm, for example from about 1 ppm to about 1,000 ppm, or from about 350 ppm to about 550 ppm, or from about 425 ppm to about 475 ppm, where ppm is parts per million based on the total weight of the toner. The amount of chelating or sequestering agent added may be from about 0.01 to about 10 percent by weight of the solution, the solution being 39 percent by weight of active chelating agent, or from about 0.01 to about 5 percent, or from about 0.5 to about 5 percent, based on the total weight of the toner. In embodiments, a chelating agent, in embodiments, EDTA, is selected in an amount of about 0.79 pph where pph is parts per hundred based on the total weight of dried toner particle.

In embodiments, the chelating agent or sequestering agent is substantially not present in the end toner, and thus is added in an amount substantially equal to the amount need to achieve the aforementioned amount of aluminum in the end toner, and substantially not in excess of such amount so that excess sequestering or chelating agent is not retained in the toner. The chelating or sequestering agent may be added near the end of the aggregation step in the emulsion aggregation toner particle formation process, although such extraction may also be done at any time subsequent to aggregation and prior to any coalescence step.

The toner particles can also contain other optional additives as desired. For example, the toner can include positive or negative charge control agents in any desired or effective amount, in embodiments, in an amount of at least about 0.1 percent by weight of the toner, or at least about 1 percent by weight or the toner, or no more than about 10 percent by weight of the toner, or no more than about 3 percent by weight of the toner. Examples of suitable charge control agents include, but are not limited to, quaternary ammonium compounds such as alkyl pyridinium halides, bisulfates, alkyl pyridinium compounds, including those disclosed in U.S. Pat. No. 4,298,672, which is hereby incorporated by reference herein in its entirety; organic sulfate and sulfonate compositions, including those disclosed in U.S. Pat. No. 4,338,390, which is hereby incorporated by reference herein in its entirety; cetylpyridinium tetrafluoroborates; distearyl dimethyl ammonium methyl sulfate; aluminum salts such as BONTRON E84™ or E88™ (Hodogaya Chemical); and the like, as well as mixtures thereof. Such charge control agents can be applied simultaneously with the shell resin or after application of the shell resin.

In preparing the toner by emulsion aggregation procedure, one or more surfactants may be used in the process. Suitable surfactants include anionic, cationic, and nonionic surfactants described above.

Any suitable emulsion aggregation procedure may be used in forming the emulsion aggregation toner particles. These procedure typically include the basic process steps of at least aggregating an aqueous latex emulsion containing the binder polymers, colorant(s), wax(es), optionally one or ore surfactants, coagulants, and any additional optional additives to form aggregates, optionally forming the shell on the aggregated core particles by addition of a latex of the shell material, optionally extracting metal (aluminum) from the particles, subsequently optionally coalescing or fusing the aggregates, and then recovering, optionally washing and optionally drying the obtained emulsion aggregation toner particles.

In embodiments, a method of preparing a toner comprising emulsion aggregation core-shell toner particles comprises obtaining a latex of core styrene-acrylate copolymers, an aqueous dispersion of the optional colorant; an aqueous dispersion of the wax; forming a mixture of the latex of core styrene-acrylate copolymers, the aqueous dispersion of the optional colorant, and the aqueous dispersion of the wax; heating the mixture to a first temperature; maintaining the first temperature to form aggregated toner particles; adding a latex of shell styrene-acrylate copolymers to form a shell over the aggregated particles; optionally, adding a solution of a chelating agent; stopping further aggregation and raising the temperature to a second temperature that is higher than the first temperature to coalesce the aggregated particles; subsequently cooling, optionally washing, and recovering the emulsion aggregation toner particles.

In a certain embodiment, a toner herein comprises: emulsion aggregation toner particles comprising a core and a shell thereover; wherein the core comprises a combination of at least two styrene-acrylate copolymers selected from a first core styrene-acrylate copolymer, a second styrene-acrylate copolymer, and a third styrene-acrylate copolymer; a wax; and an optional colorant; wherein the first core styrene-acrylate copolymer has a weight average molecular weight of from about 32,000 g/mol to about 38,000 g/mol and an onset glass transition temperature of from about 57.0° C. to about 61.0° C.; wherein the second core styrene-acrylate copolymer has a weight average molecular weight of from about 52,000 g/mol to about 58,000 g/mol and an onset glass transition temperature of from about 53.0° C. to about 57.0° C.; and wherein the third core styrene-acrylate copolymer has a weight average molecular weight of from about 33,000 g/mol to about 39,000 g/mol and an onset glass transition temperature of from about 49.0° C. to about 53.0° C.; wherein the shell comprises at least one styrene-acrylate copolymer selected from a first shell styrene-acrylate copolymer, a second shell styrene acrylate copolymer, or a combination thereof; wherein the first shell styrene-acrylate copolymer has a weight average molecular weight of from about 32,000 g/mol to about 38,000 g/mol and an onset glass transition temperature of from about 57.0° C. to about 61.0° C.; and wherein the second shell styrene-acrylate copolymer has a weight average molecular weight of from about 52,000 g/mol to about 58,000 g/mol and an onset glass transition temperature of from about 53.0° C. to about 57.0° C.; wherein the toner comprises from about 50 to about 60 percent by weight core, from about 26 to about 30 percent by weight shell, from about 3 to about 10 percent by weight colorant, and from about 7 to about 20 percent by weight wax, based on total weight of the toner.

In embodiments, the toner particles have a volume-averaged median particle diameter of from about 1 to about 15 micrometers, or from about 2 to about 10 micrometers, or from about 4 to about 9 micrometers, measured using a Coulter Counter Multisizer 3. In embodiments, the toner particles have a mean circularity of about 0.93 to about 0.98, measured using a Malvern Sysmex Flow Particle Image Analyzer (FPIA3000). The circularity is a measure of the particles closeness to a perfect sphere. A circularity of 1.0 identifies a particle having the shape of a perfect circular sphere.

The toner particles cohesivity is associated to some degree with the surface morphology of the particles. The rounder/smoother the surface of the particles, the lower the cohesion and the greater the flow. As the surface becomes less round/rougher, the flow worsens and the cohesion increases.

The toner particles also may have a size distribution such that the volume geometric standard deviation (GSDv) for (D84/D50) is in the range of from about 1.15 to about 1.25. The volume-averaged particle diameters at which a cumulative percentage of 50% of the total toner particles are attained are defined as 5 volume D50, and the volume-averaged particle diameters at which a cumulative percentage of 84% are attained are defined as volume D84. These aforementioned volume average particle size distribution indexes GSDv can be expressed by using D50 and D84 in cumulative distribution, wherein the volume average particle size distribution index GSDv is expressed as (volume D84/volume D50). The GSDv value for the toner particles indicates that the toner particles are made to have a very narrow particle size distribution.

There can also be blended with the toner particles external additive particles, including flow aid additives, which can be present on the surfaces of the toner particles. Examples of these additives include, but are not limited to, metal oxides, such as titanium oxide, silicon oxide, tin oxide, and the like, as well as mixtures thereof colloidal and amorphous silicas, such as AEROSIL®, metal salts and metal salts of fatty acids including zinc stearate, aluminum oxides, cerium oxides, and the like, as well as mixtures thereof. Each of these external additives can be present in any desired or effective amount, in embodiments, in an amount of at least about 0.1 percent by weight of the toner, or at least about 0.25 percent by weight of the toner, or no more than about 5 percent by weight of the toner, or no more than about 3 percent by weight of the toner. Suitable additives include, but are not limited to, those disclosed in U.S. Pat. Nos. 3,590,000 and 6,214,507, each of which are hereby incorporated by reference herein in their entireties. These additives can be applied simultaneously with the shell resin or after application of the shell resin.

The present toners may be formulated into a developer composition. Developer compositions can be prepared by mixing the toners of the present disclosure with known carrier particles, including coated carriers, such as steel, ferrites, and the like. Such carriers include those disclosed in U.S. Pat. Nos. 4,937,166 and 4,935,326, the entire disclosures of each of which are incorporated herein by reference.

The toners may be present in the carrier in amounts of from about 1% to about 15% by weight, from about 2% to about 8% by weight, or from about 4% to about 6% by weight. The carrier particles can also include a core with a polymer coating thereover, such as polymethylmethacrylate (PMMA), having dispersed therein a conductive component like conductive carbon black. Carrier coatings include silicone resins such as methyl silsesquioxanes, fluoropolymers such as polyvinylidiene fluoride, mixtures of resins not in close proximity in the triboelectric series such as polyvinylidiene fluoride and acrylics, thermosetting resins such as acrylics, mixtures thereof and other known components.

The present toners may be used in a variety of xerographic processes and with a variety of xerographic printers. A xerographic imaging process includes, for example, preparing an image with a xerographic printer comprising a charging component, an imaging component, a photoconductive component, a developing component, a transfer component, and a fusing component. In embodiments, the development component may include a developer prepared by mixing a carrier with any of the toners described herein. The xerographic printer may be a high speed printer, a black and white high speed printer, a color printer, and the like. Once the image is formed with the toners/developers, the image may then be transferred to an image receiving medium such as paper and the like. Fuser roll members may be used to fuse the toner to the image-receiving medium by using heat and pressure. Use of the present toners with a xerographic printing process can provide printed images having the characteristics described herein and other desirable characteristics.

The present toners find use in other applications such as powder coating applications in which a powder spray gun (e.g., a tribo gun) containing any of the present toners is used to deliver the toner to a substrate.

In embodiments, a process herein comprises forming an image with the toner described herein using a xerographic printer; transferring the image comprising the toner to an image receiving medium; and fusing the toner to the image receiving medium to form a toner image.

EXAMPLES

The following Examples are being submitted to further define various species of the present disclosure. These Examples are intended to be illustrative only and are not intended to limit the scope of the present disclosure. Also, parts and percentages are by weight unless otherwise indicated.

Toners were prepared using an aggregation/coalescence process as follows.

1. Core materials (latex, pigment, wax) and deionized water were mixed in a gallon reactor.
2. The contents of the reactor were homogenized using a rotor/stator homogenizer and polyaluminum chloride flocculant was added.
3. The reactor was heated to between 52° C. to 59° C. for aggregation. Agitator speed was set according to slurry viscosity. Particle size (D50v) was monitored using a Coulter Multisizer-3 instrument.
4. Once a pre-shell particle size of about 5.3 micrometers was achieved, shell latex was added to the reactor using a metered pump
5. Slurry pH was increased to between 4.5 and 5.7 by adding NaOH solution and Versene™ 100 solution. Agitator speed was gradually decreased according to viscosity. The batch was then held for 10 minutes.
6. The reactor was heated to about 80° C. $HNO_3$ solution was added to the reactor to achieve pH between 4.0 and 5.2. The reactor was then heated to the coalescence temperature between 92.0 and 98.0° C.

7. The reactor was held at coalescence temperature until a circularity between 0.970 and 0.975 was achieved. Circularity was monitored using FPIA Sysmex 3000 instrument.
8. Then NaOH solution was added to raise pH to 6.0. The reactor was then cooled to below 63° C., when the pH was further raised to 8.8 using 1M NaOH. The reactor was then cooled to room temperature.
9. The contents of the reactor were collected and then sieved, washed, and dried using the usual methods.

Material properties tables follow. In Table 2, Sty-A 1 means styrene-acrylate copolymer 1, Sty-A 2 means styrene-acrylate copolymer 2, and Sty-A 3 means styrene-acrylate copolymer 3, as described herein.

TABLE 1

| Wax Dispersion | Wax Type | Tm (° C.) |
|---|---|---|
| Wax 1 | Paraffin | 75 |
| Wax 2 | Fischer-Tropsch | 91 |
| Wax 3 | Polyethylene | 100 |

moved toward increased Tg and increased Mw in order to improve the toner's storage stability and durability. Different latex compositions selected for particle core and particle shell are selected to further optimize toner properties. Higher Tg and Mw in the shell is generally favorable for improving storage stability and durability, while lower Tg and Mw in the core is generally favorable for improving gloss and low-melt characteristics.

Wax formulation can have a significant influence on toner melt properties. Low-melt wax, such as Paraffin, leads to increased melt-flow (lower T½) and decreased Tg. Wax can also influence other machine performance metrics, such as hot offset and ultra fine particle emission. In embodiments, wax type and amount are selected to influence these properties.

Aluminum complexes used as flocculants can also influence toner melt properties. Residual aluminum can crosslink the coalesced resins causing a decrease in melt-flow. This can lead to decreased floss and fix properties. A minimum amount of flocculant is desired to facilitate aggregation; however, it is possible to add a chelating agent during the freeze step to remove excess aluminum.

TABLE 2

| Example | Core Latex | Core Wax | Core Pigment | Shell Latex | Flocculant | Gloss Agent |
|---|---|---|---|---|---|---|
| 1 | 54.5% Sty-A 3 | 10.0% Wax 2 (Fischer-Tropsch) | 6.5% Regal330 1.0% PB15:3 | 28.0% Sty-A 1 | 0.18 pph PAC | 0.94 pph EDTA |
| 2 | 34.6% Sty-A 2 20.9% Sty-A 3 | 9.0% Wax 3 (Polyethylene) | 6.6% Regal330 1.0% PB15:3 | 28.0% Sty-A 2 | 0.18 pph PAC | 0.79 pph EDTA |
| 3 | 52.5% Sty-A 3 | 12.0% Wax 2 (Fischer-Tropsch) | 6.5% Regal330 1.0% PB15:3 | 28.0% Sty-A 2 | 0.18 pph PAC | 0.79 pph EDTA |
| 4 | 54.0% Sty-A 3 | 12.0% Wax 2 (Fischer-Tropsch) | 5.2% Regal330 1.0% PB15:3 | 28.0% Sty-A 2 | 0.18 pph PAC | 0.79 pph EDTA |
| 5 | 54.0% Sty-A 3 | 12.0% Wax 2 (Fischer-Tropsch) | 5.2% Regal330 1.0% PB15:3 | 28.0% Sty-A 2 | 0.18 pph PAC | 0.79 pph EDTA |
| 6 | 54.0% Sty-A 3 | 12.0% Wax 2 (Fischer-Tropsch) | 5.2% Regal330 1.0% PB15:3 | 28.0% Sty-A 2 | 0.18 pph PAC | 0.79 pph EDTA |
| 7 | 28.0% Sty-A 2 24.5% Sty-A 1 | 12.0% Wax 2 (Fischer-Tropsch) | 6.6% Regal330 1.0% PB15:3 | 28.0% Sty-A 1 | 0.18 pph PAC | 0.79 pph EDTA |
| 8 | 28.0% Sty-A 2 24.5% Sty-A 1 | 12.0% Wax 1 (Paraffin) | 6.6% Regal330 1.0% PB15:3 | 28.0% Sty-A 1 | 0.18 pph PAC | 0.79 pph EDTA |

TABLE 3

| Example | DR VD50 (μm) | DR ND50/16 | DR VD84/50 | DR Circularity |
|---|---|---|---|---|
| 1 | 5.75 | 1.246 | 1.199 | 0.974 |
| 2 | 7.18 | 1.217 | 1.193 | 0.969 |
| 3 | 6.56 | 1.196 | 1.178 | 0.976 |
| 4 | 6.75 | 1.193 | 1.169 | 0.980 |
| 5 | 6.13 | 1.201 | 1.177 | 0.979 |
| 6 | 5.65 | 1.216 | 1.187 | 0.974 |
| 7 | 5.51 | 1.223 | 1.219 | 0.972 |
| 8 | 5.70 | 1.216 | 1.217 | 0.976 |

Toner properties can be finely tuned by modifying the types and amounts of raw materials used in the aggregation/coalescence process. Overall toner molecular weight (Mw) and glass transition temperature (Tg) can be influenced by the core latex and the shell latex. The examples illustrate various combinations of three styrene-acrylate latex, where each latex has a unique Tg and Mw. The toner composition In embodiments, two levels of pigment loading were selected to observe the range of dielectric loss and optical density due to carbon black.

Particle size and shape influence many xerographic properties, such as Tribo, flow, and transfer. The present toner compositions enable a wide range of toner sizes and shapes which meet machine requirements and provide desired toner properties.

TABLE 4

| Example | Mw (pse) [GPC Mixed Bed] | Al (ug/g) [ICP] | Tg Onset (2nd heat) (° C.) [DSC] |
|---|---|---|---|
| 1 | 33745 | 306 | 52.3 |
| 2 | 51756 | 397 | 51.5 |
| 3 | 42915 | 393 | 49.1 |
| 4 | 43572 | 392 | 50.1 |
| 5 | 43787 | 396 | 51.4 |

TABLE 4-continued

| Example | Mw (pse) [GPC Mixed Bed] | Al (ug/g) [ICP] | Tg Onset (2nd heat) (° C.) [DSC] |
|---|---|---|---|
| 6 | 44519 | 387 | 49.5 |
| 7 | 43402 | 450 | 55.8 |
| 8 | 43212 | 450 | 53.4 |

A toner particle composition comprising the following components was prepared.

Examples 9 through 22 having the components shown in Table 5 below were prepared by the process described above.

TABLE 5

| Example | Core Latex | Core Wax | Core Pigment | Shell Latex | Flocculant | Gloss Agent |
|---|---|---|---|---|---|---|
| 9 | 57.0% Sty-A 3 | 10.0% Wax 2 (Fischer-Tropsch) | 5.0% PB15:3 | 28.0% Sty-A 1 | 0.18 pph PAC | 0.94 pph EDTA |
| 10 | 36.5% Sty-A 2<br>21.5% Sty-A 3 | 9.0% Wax 3 (Polyethylene) | 5.0% PB15:3 | 28.0% Sty-A 2 | 0.18 pph PAC | 0.79 pph EDTA |
| 11 | 51.0% Sty-A 3 | 16.0% Wax 2 (Fischer-Tropsch) | 5.0% PB15:3 | 28.0% Sty-A 2 | 0.18 pph PAC | 0.79 pph EDTA |
| 12 | 55.0% Sty-A 3 | 12.0% Wax 2 (Fischer-Tropsch) | 5.0% PB15:3 | 28.0% Sty-A 2 | 0.18 pph PAC | 0.79 pph EDTA |
| 13 | 51.0% Sty-A 3 | 16.0% Wax 2 (Fischer-Tropsch) | 5.0% PB15:3 | 28.0% Sty-A 2 | 0.14 pph PAC | 0.4 pph EDTA |
| 14 | 51.0% Sty-A 3 | 16.0% Wax 2 (Fischer-Tropsch) | 5.0% PB15:3 | 28.0% Sty-A 2 | 0.14 pph PAC | 0.6 pph EDTA |
| 15 | 55.0% Sty-A 3 | 12.0% Wax 2 (Fischer-Tropsch) | 5.0% PB15:3 | 14.0% Sty-A 1<br>14.0% Sty-A 2 | 0.18 pph PAC | 0.79 pph EDTA |
| 16 | 27.5% Sty-A 3<br>27.5% Sty-A 2 | 12.0% Wax 2 (Fischer-Tropsch) | 5.0% PB15:3 | 28.0% Sty-A 2 | 0.18 pph PAC | 0.94 pph EDTA |
| 17 | 41.3% Sty-A 3<br>13.7% Sty-A 2 | 12.0% Wax 2 (Fischer-Tropsch) | 5.0% PB15:3 | 28.0% Sty-A 2 | 0.18 pph PAC | 0.86 pph EDTA |
| 18 | 41.3% Sty-A 3<br>13.7% Sty-A 2 | 12.0% Wax 2 (Fischer-Tropsch) | 5.0% PB15:3 | 28.0% Sty-A 2 | 0.18 pph PAC | 0.94 pph EDTA |
| 19 | 29.0% Sty-A 3<br>29.0% Sty-A 2 | 9.0% Wax 2 (Fischer-Tropsch) | 5.0% PB15:3 | 28.0% Sty-A 2 | 0.18 pph PAC | 0.94 pph EDTA |
| 20 | 27.0% Sty-A 1<br>28.0% Sty-A 2 | 12.0% Wax 2 (Fischer-Tropsch) | 5.0% PB15:3 | 28.0% Sty-A 1 | 0.18 pph PAC | 0.79 pph EDTA |
| 21 | 55.0% Sty-A 3 | 12.0% Wax 1 (Paraffin) | 5.0% PB15:3 | 28.0% Sty-A 2 | 0.18 pph PAC | 0.79 pph EDTA |
| 22 | 27.0% Sty-A 1<br>28.0% Sty-A 2 | 12.0% Wax 1 (Paraffin) | 5.0% PB15:3 | 28.0% Sty-A 1 | 0.18 pph PAC | 0.79 pph EDTA |

Properties for Examples 9 through 22 are shown in Table 6 and Table 7.

TABLE 6

| Example | DR VD50 (μm) | DR ND50/16 | DR VD84/50 | DR Circularity |
|---|---|---|---|---|
| 9 | 5.51 | 1.228 | 1.190 | 0.980 |
| 10 | 6.84 | 1.205 | 1.187 | 0.971 |
| 11 | 6.60 | 1.225 | 1.168 | 0.978 |
| 12 | 6.53 | 1.204 | 1.164 | 0.976 |
| 13 | 6.36 | 1.204 | 1.175 | 0.975 |
| 14 | 6.52 | 1.214 | 1.168 | 0.977 |
| 15 | 6.49 | 1.202 | 1.169 | 0.977 |
| 16 | 6.12 | 1.207 | 1.181 | 0.978 |
| 17 | 6.05 | 1.213 | 1.189 | 0.977 |
| 18 | 6.11 | 1.205 | 1.185 | 0.976 |
| 19 | 6.11 | 1.210 | 1.183 | 0.975 |
| 20 | 6.18 | 1.201 | 1.184 | 0.973 |
| 21 | 6.40 | 1.199 | 1.187 | 0.976 |
| 22 | 6.32 | 1.218 | 1.199 | 0.977 |

TABLE 7

| Example | Mw (pse) [GPC Mixed Bed] | Al (ug/g) [ICP] | Tg Onset (2nd heat) (° C.) [DSC] |
|---|---|---|---|
| 9 | 34345 | 288 | 51.8 |
| 10 | 52084 | 395 | 50.9 |
| 11 | 42828 | 395 | 49.2 |
| 12 | 42279 | 411 | 49.8 |
| 13 | 42262 | 463 | 49.2 |
| 14 | 42476 | 361 | 48.9 |
| 15 | 37904 | 412 | 50.0 |
| 16 | 52226 | 282 | 51.5 |
| 17 | 48035 | 349 | 51.0 |

TABLE 7-continued

| Example | Mw (pse) [GPC Mixed Bed] | Al (ug/g) [ICP] | Tg Onset (2nd heat) (° C.) [DSC] |
|---|---|---|---|
| 18 | 47856 | 338 | 52.1 |
| 19 | 52834 | 359 | 50.7 |
| 20 | 42825 | 467 | 56.3 |
| 21 | 43568 | 441 | 47.5 |
| 22 | 44382 | 524 | 52.8 |

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims. Unless specifically recited in a claim, steps or components of claims should not be implied or imported from the specification or any other claims as to any particular order, number, position, size, shape, angle, color, or material.

The invention claimed is:

1. A toner comprising:

toner particles comprising a core and a shell thereover;

wherein the core comprises a first core styrene-acrylate copolymer and a second core styrene-acrylate copolymer; a wax; and an optional colorant;

wherein the first core styrene-acrylate copolymer is a styrene-n-butylacrylate-β-carboxyethylacrylate copolymer having a weight average molecular weight of from about 32,000 g/mol to about 38,000 g/mol and an onset glass transition temperature of from about 57.0° C. to about 61.0° C.;

wherein the second core styrene-acrylate copolymer is a styrene-n-butylacrylate-β-carboxyethylacrylate copolymer having a weight average molecular weight of from about 52,000 g/mol to about 58,000 g/mol and an onset glass transition temperature of from about 53.0° C. to about 57.0° C.; and wherein the shell comprises a single styrene-acrylate copolymer;

wherein the single shell styrene-acrylate copolymer is the first styrene-n-butylacrylate-β-carboxyethylacrylate copolymer having a weight average molecular weight of from about 32,000 g/mol to about 38,000 g/mol and an onset glass transition temperature of from about 57.0° C. to about 61.0° C.

2. The toner of claim 1, wherein the toner comprises:

from about 50 to about 80 percent by weight core;

from about 20 to about 36 percent by weight shell;

from about 3 to about 10 percent by weight colorant;

from about 5 to about 20 percent by weight wax;

based on total weight of the toner.

3. A toner comprising toner particles comprising a core and a shell thereover; wherein the core comprises a combination of a first core styrene-n-butylacrylate-β-carboxyethylacrylate copolymer having a weight average molecular weight of from about 32,000 g/mol to about 38,000 g/mol and an onset glass transition temperature of from about 57.0° ° C. to about 61.0° C. and a second core styrene-n-butylacrylate-β-carboxyethylacrylate copolymer having a weight average molecular weight of from about 52,000 g/mol to about 58,000 g/mol and an onset glass transition temperature of from about 53.0° C. to about 57.0° ° C.

4. The toner of claim 1, wherein the wax is selected from a member of the group consisting of a polyethylene wax, a paraffin wax, a Fischer-Tropsch wax, and combinations thereof.

5. The toner of claim 1, wherein the wax is a Fischer-Tropsch wax having a peak melt temperature of from about 70° C. to about 100° C.

6. The toner of claim 1, wherein the wax is a paraffin wax.

7. The toner of claim 1, wherein the wax is a polyethylene wax.

8. The toner of claim 1, wherein the optional colorant is present and wherein the colorant is selected from cyan, magenta, yellow, black, or a combination thereof.

9. The toner of claim 1, wherein the optional colorant is present and wherein the colorant comprises a combination of cyan pigment and carbon black.

10. The toner of claim 1, further comprising:

a flocculant, a chelating agent, or a combination thereof.

11. The toner of claim 1, the toner having an onset glass transition temperature (Tg) of from about 53.0° C. to about 60.0° C.

12. A method of preparing a toner comprising emulsion aggregation core-shell toner particles comprising toner particles comprising a core and a shell thereover;

wherein the core comprises a first styrene-acrylate copolymer and a second styrene-acrylate copolymer, a wax; and an optional colorant;

wherein the first styrene-acrylate copolymer is a styrene-n-butylacrylate-β-carboxyethylacrylate copolymer having a weight average molecular weight of from about 32,000 g/mol to about 38,000 g/mol and an onset glass transition temperature of from about 57.0° C. to about 61.0° C.;

wherein the second styrene-acrylate copolymer is a styrene-n-butylacrylate-β-carboxyethylacrylate copolymer having a weight average molecular weight of from about 52,000 g/mol to about 58,000 g/mol and an onset glass transition temperature of from about 53.0° C. to about 57.0° C.; and the method comprising:

obtaining a latex of the core styrene-acrylate copolymers, an aqueous dispersion of the optional colorant; an aqueous dispersion of the wax;

forming a mixture of the latex of the core styrene-acrylate copolymers, the aqueous dispersion of the optional colorant, and the aqueous dispersion of the wax;

heating the mixture to a first temperature;

maintaining the first temperature to form aggregated toner particles;

adding a latex of shell styrene-n-butylacrylate-β-carboxyethylacrylate copolymer to form a shell over the aggregated particles;

optionally, adding a solution of a chelating agent;

stopping further aggregation and raising the temperature to a second temperature that is higher than the first temperature to coalesce the aggregated particles;

subsequently cooling, optionally washing, and recovering the emulsion aggregation toner particles.

13. The method of claim 12 wherein the toner shell comprises a single styrene-n-butylacrylate-β-carboxyethylacrylate copolymer, and wherein the single shell styrene-acrylate copolymer is the first styrene-n-butylacrylate-β-carboxyethylacrylate copolymer having a weight average molecular weight of from about 32,000 g/mol to about 38,000 g/mol and an onset glass transition temperature of from about 57.0° C. to about 61.0° C.

14. The method of claim 12, wherein the wax is selected from a member of the group consisting of a Fischer-Tropsch wax, a polyethylene wax, a paraffin wax, and combinations thereof; and wherein the optional colorant is present and wherein the colorant is selected from cyan, magenta, yellow, black, carbon black, copper phthalocyanine, PR122, PR269, PY74, or a combination thereof.

15. The method of claim 12, wherein the method comprises a batch emulsion aggregation process.

16. The method of claim 12, the toner having an onset glass transition temperature (Tg) of from about 53.0° C. to about 60.0° C.

* * * * *